Nov. 22, 1932.                B. LOEFFLER                1,888,231

POSITIVE LUBRICATING DEVICE FOR CLUTCH THROW-OUT BEARINGS

Filed Sept. 12, 1929

Inventor:
Bruno Loeffler,
By his Attorneys:
Redding, Greeley, O'Shea & Campbell

Patented Nov. 22, 1932

1,888,231

UNITED STATES PATENT OFFICE

BRUNO LOEFFLER, OF PLAINFIELD, NEW JERSEY, ASSIGNOR TO INTERNATIONAL MOTOR COMPANY, OF NEW YORK, N. Y., A CORPORATION OF DELAWARE

POSITIVE LUBRICATING DEVICE FOR CLUTCH THROW-OUT BEARINGS

Application filed September 12, 1929. Serial No. 392,081.

The present invention relates to lubricating systems and embodies, more specifically, an improved device for lubricating clutch throw out bearings, wherein such bearings receive lubricant through a positive and effective periodic supply.

One objectionably weak feature of clutch constructions now available is that of the insufficient lubrication of the clutch throw out bearings. These bearings receive considerable wear and, in many instances, are used to such a great extent that the casual supply of lubricant thereto is entirely inadequate to effect proper lubrication of the parts. The present invention seeks to provide a device for positively lubricating such elements and contemplates the provision of a lubricating device which is operated directly in accordance with the relative rotation between the elements of the bearing.

An object of the invention, therefore, is to provide a lubricating device for clutch throw out bearings which positively and effectively lubricates the same.

A further object of the invention is to provide a lubricating device of the above character in which a source of lubricant under pressure is connected with the clutch throw out bearing and the pressure thereof periodically subjected to the bearing.

A further object of the invention is to provide a lubricating device of the character last described in which the lubricant under pressure is controlled and the pressure thereof subjected to the bearing periodically in accordance with the relative rotation of the bearing parts.

In the attainment of the above objects, the source of lubricant communicates with a port in a plunger, such plunger normally being closed by the walls of a chamber in which the plunger moves, the plunger being elevated to expose the port and permit the lubricant to escape therefrom into the bearing when a corresponding cam rides off of the top of the plunger. In this manner, lubricant is periodically supplied to the bearing in proportion to the speed of rotation of the rotating element.

Further objects, not specifically enumerated above, will be apparent as the invention is described in greater detail in connection with the accompanying drawing, wherein.

Referring to the above drawing, $a$ designates a transmission shaft journaled in an element $b$, constituting one of the rotating elements of the clutch. The element $b$ is formed with a sleeve $b'$ upon which a sleeve $c$ is slidably mounted. This sleeve is formed with an annular groove $c'$ with which the throw out yoke engages.

An annular housing $d$ is carried upon the sleeve $c$ by means of a bearing $d'$, such housing carrying a second element $b^2$ of the clutch. The bearing $d'$ engages against a shoulder $c^2$ and is secured thereto by means of a collar $d^2$ and a nut $d^3$. The nut may be provided with an oil seal $d^4$ and a second oil seal $d^5$ is provided between the housing and sleeve $c$ at the other end of the bearing.

A groove $c^3$ and recess $c^4$ are formed in the sleeve $c$ and permit lubricant from the bearing to pass to the engaging surfaces between the sleeve $c$ and sleeve $b'$. Upon collar $d^2$ a cam $d^6$ is formed, the purpose of this cam being described more fully hereinafter.

Figure 1:
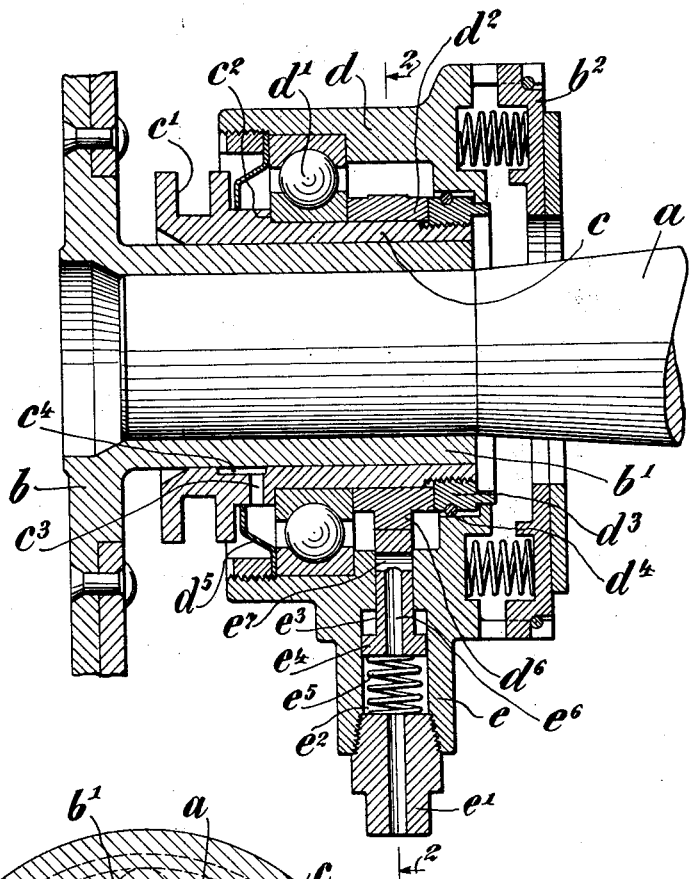
Figure 1 is a view in section, taken on line 1—1 of Figure 2, and looking in the direction of the arrows, such figure showing the details of construction embodied in the present invention.
Figure 2:
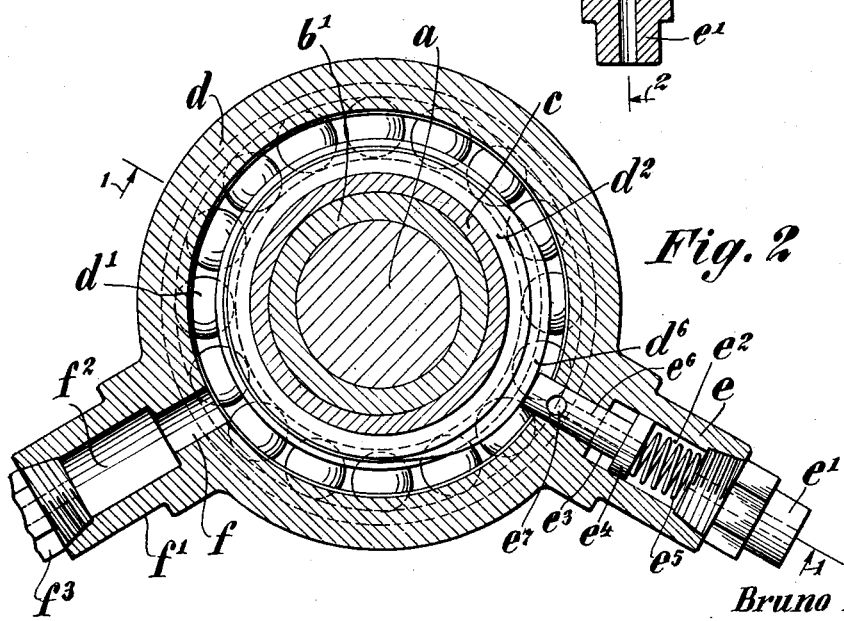
Figure 2 is a view in section, taken on line 2—2 of Figure 1, and looking in the direction of the arrows.

The housing $d$ is formed with an extension $e$, at the extremity of which a fitting $e'$ is received. This fitting is preferably carried on one end of a flexible hose section which communicates with a source of lubricant and thus supplies the lubricant to a chamber $e^2$ within the extension $e$. A plunger $e^3$ is carried within the housing $d$ and is formed with an enlarged head $e^4$ which rides in the chamber $e^2$. Retractile spring $e^5$ normally urges the plunger outwardly against the cam $d^6$, as clearly shown in Figure 1.

The plunger $e^3$ is provided with an axial bore $e^6$ communicating with a radial bore $e^7$, the ports formed by the radial bore normally being closed by the housing $d$. When the plunger rides off of the cam $d^6$, the ports are exposed and lubricant from the chamber $e^2$ is forced into the bearing chamber and effectively lubricates the bearing $d'$. Excess lubricant passes out aperture $f$ into a chamber $f^2$ in an extension $f'$. A suitable flexible conduit is connected to the extension $f^2$ by means of a fitting $f^3$, in this matter preserving a tight joint and bearing which is effectively lubricated at all times.

While the invention has been described with specific reference to the construction shown in the accompanying drawing, it is not to be limited, save as defined in the appended claim.

What I claim is:

A lubricating device comprising relatively rotatable elements, a bearing therebetween, a source of lubricant under pressure, a chamber carried by one of the elements, the source of lubricant communicating with the chamber, a plunger in the chamber movable radially with respect to the axis of the bearing, an axial passage and a radial port in the plunger forming a communication between the source of lubricant and the chamber and bearing, said port being adapted to be closed by the walls of the chamber, a coiled cylindrical spring coaxial with the plunger and source of lubricant whereby uninterrupted flow of the lubricant is afforded, and a radial cam on the other element engaging the plunger to close the port therein intermittently.

This specification signed this 6th day of Sept. A. D. 1929.

BRUNO LOEFFLER.